July 10, 1928.
J. M. LEAVER. ET AL
METHOD AND APPARATUS FOR UNSTACKING LUMBER
Filed April 7, 1924     4 Sheets-Sheet 1
1,676,957
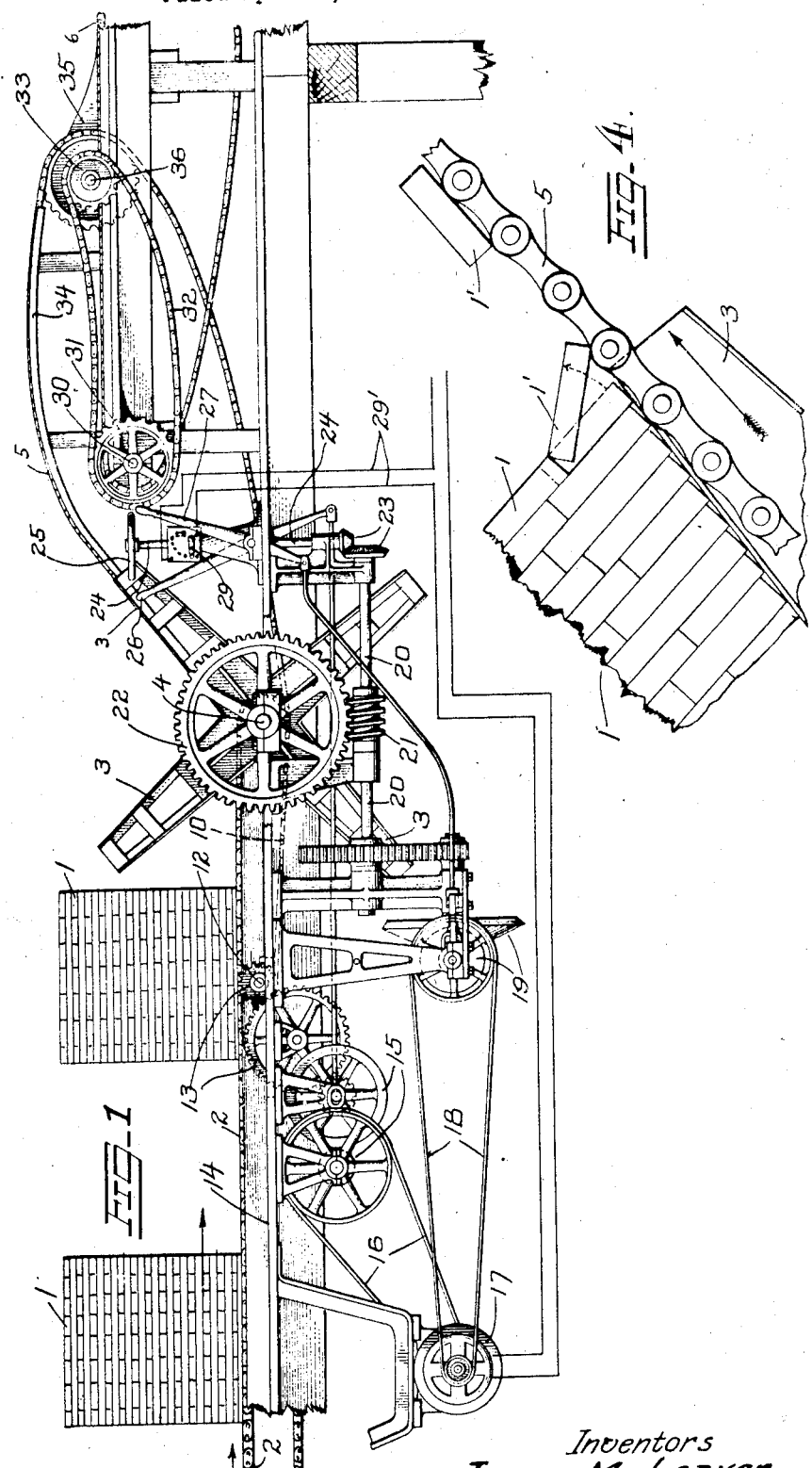
Inventors
James M. Leaver
and James M. Leaver Jr.
By Julien A. Bried
Attorney

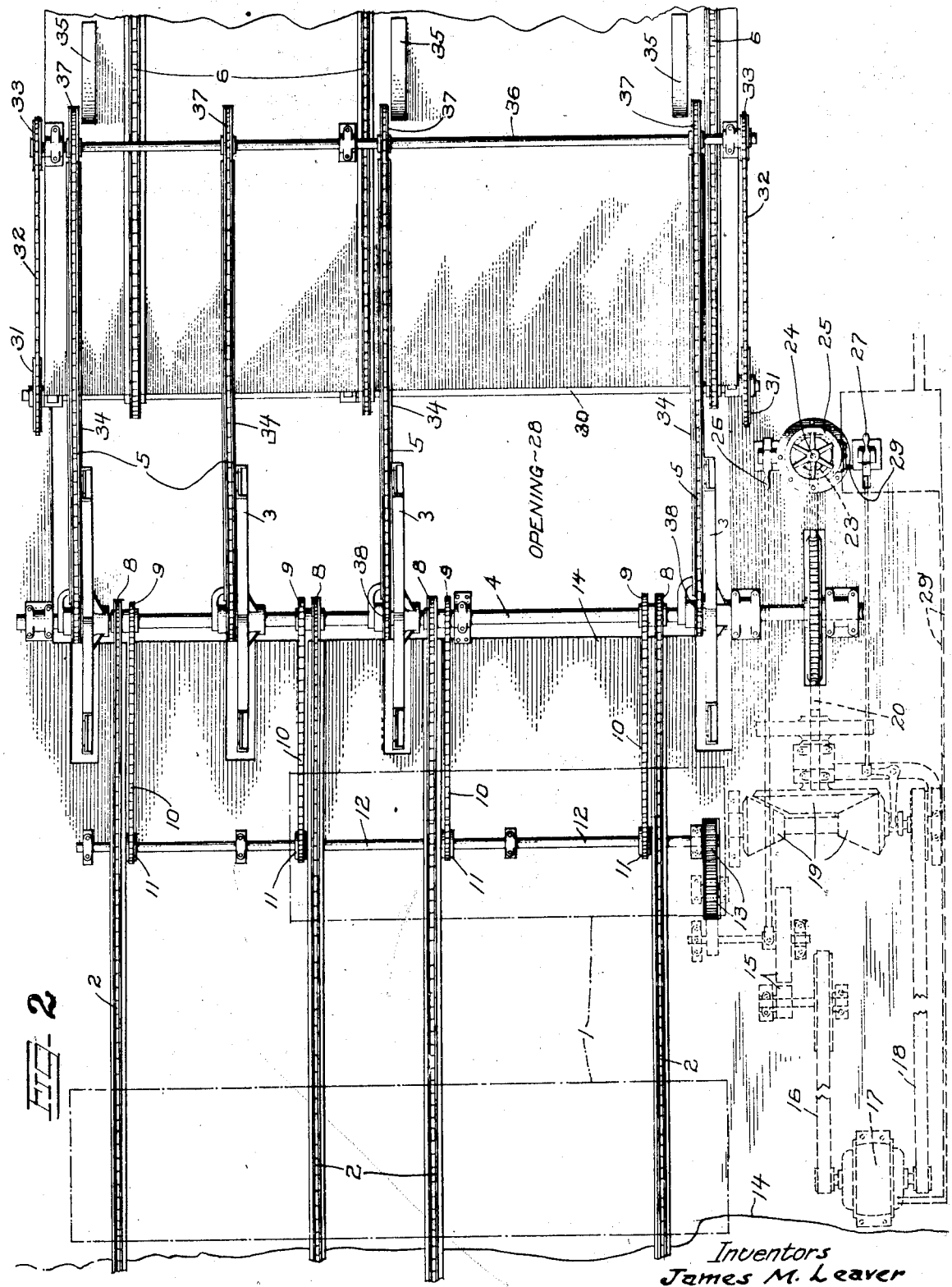

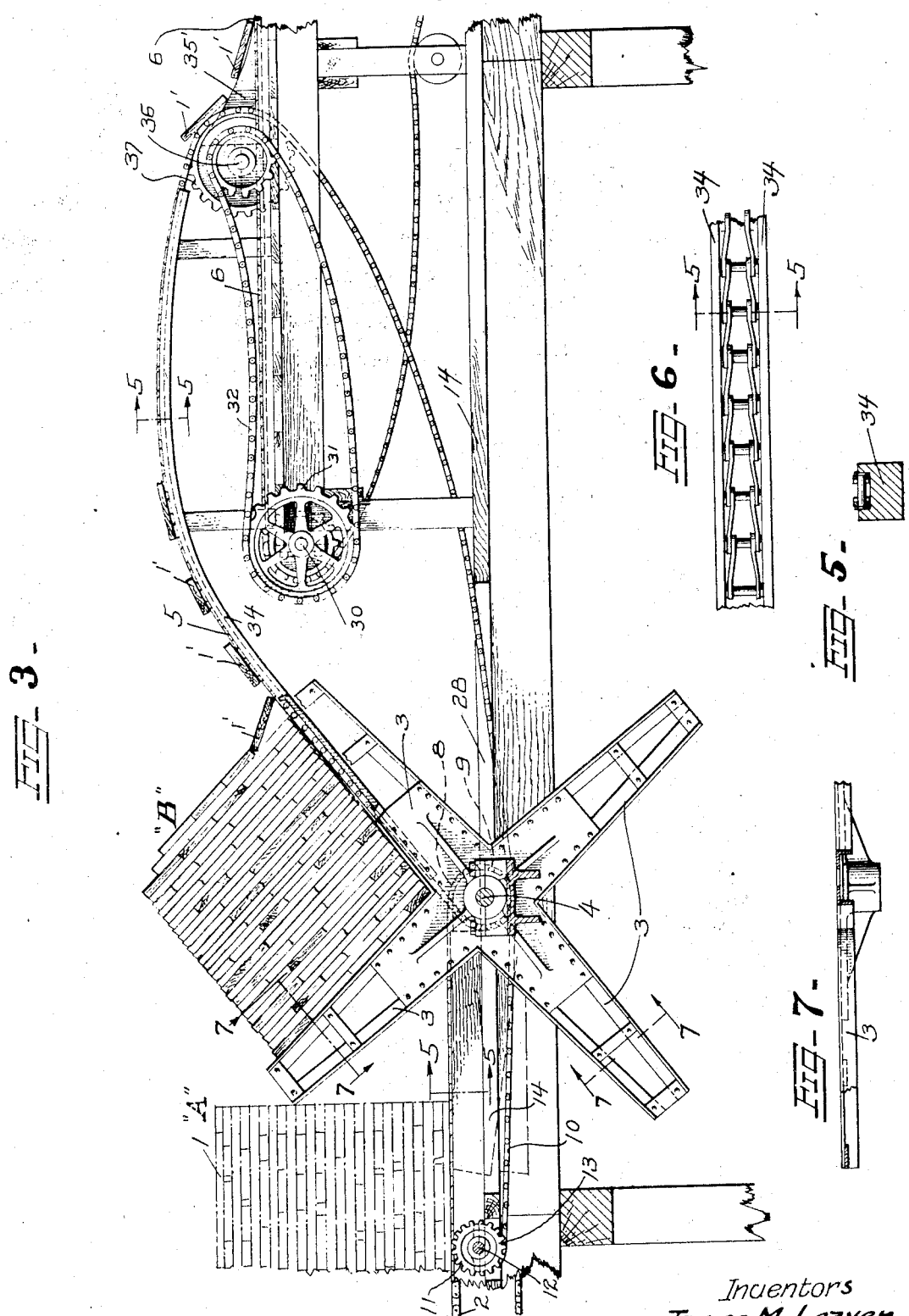

July 10, 1928.  
J. M. LEAVER, ET AL  
1,676,957  
METHOD AND APPARATUS FOR UNSTACKING LUMBER  
Filed April 7, 1924   4 Sheets-Sheet 4
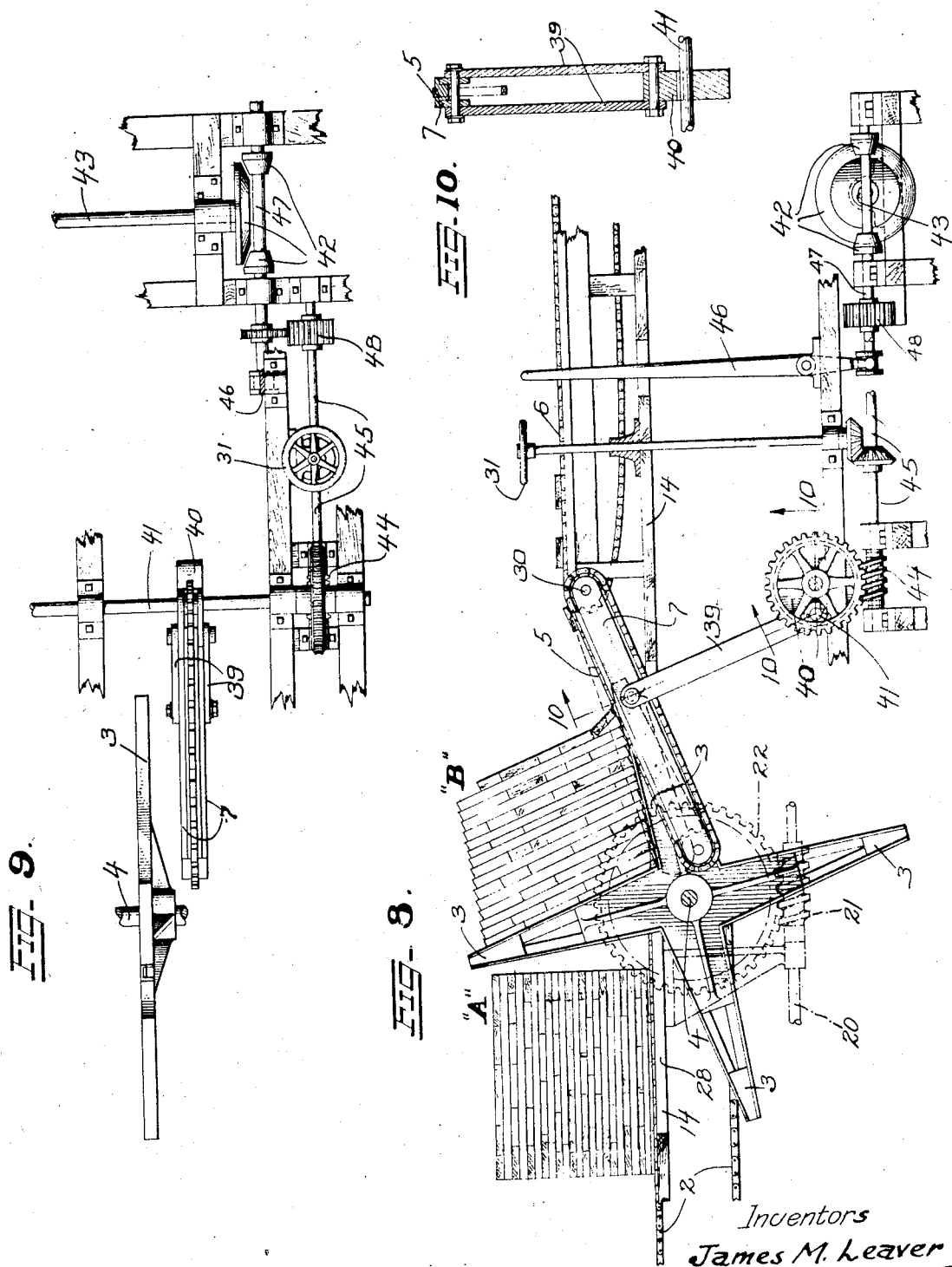
Inventors  
James M. Leaver  
and James M. Leaver Jr.  
By  
Julien A. Briet  
Attorney Patented July 10, 1928.

1,676,957

UNITED STATES PATENT OFFICE.

JAMES M. LEAVER AND JAMES M. LEAVER, JR., OF OAKLAND, CALIFORNIA.

METHOD AND APPARATUS FOR UNSTACKING LUMBER.

Application filed April 7, 1924. Serial No. 704,714.

This invention relates to the lumber industry and the handling of certain piles or stacks of sawn lumber known as "units" of boards or planks, either with or without "stickers" or "crossers" and has to do specifically with a method of unstacking such units and the proper apparatus for carrying out the method.

Before explaining the invention further it might be well to call attention to the fact that heretofore in the unstacking of such units a gang of men were always employed to break down the stack, remove the boards and feed them to a sorting table.

The objects of our invention are to provide a method which permits of this work of unstacking being done mechanically, and to provide a practicable, durable association of mechanical elements for carrying out the method.

With our method the units are brought to the vicinity of the sorting table or chains on a drag conveyor, and one complete unit at a time is picked up by a set of arms, tipped over at an angle so that the boards will slide to definitely position their edges in relation to a series of moving pick up chains which pick off one board or plank after the other and deliver them to the sorting table chains.

In picking off the boards the apparatus is adjusted either automatically or by hand to maintain a constant angular relation of the pick off chains at the pick off point as layer after layer of planks is removed.

The apparatus to carry out the operations described may assume many forms, tho but one form is shown in the accompanying drawings.

We wish it understood however that we do not limit ourselves to this one form but wish to include in our claims any apparatus which will function as described to carry out our method of unstacking.

In the drawings, Figure 1 is a side elevation of our unstacker with a lumber unit being delivered to the tipping arms.

Figure 2 is a plan view of Figure 1. Figure 3 is an enlarged side elevation of the tipping arms with a unit in place therein, and also shows the pick off chains in their relation to the arms.

Figure 4 is a still larger detail of the pick off chains in relation to the edges of the planks being picked off of the unit.

Figures 5, 6, and 7 are structural sections of Figure 3 along similarly numbered sectional indicia.

Figures 8 and 9 are, respectively, side elevation and plan views of the tipping arms and pick off elements showing additional adjustment to the latter for controlling the picking angle.

Figure 10 is a section of Figure 8 along the line indicated thereon.

In further detail the figures show at 1 the lumber units being conveyed on a chain or other receiving conveyor 2 to the tipping arms 3, which latter are spaced along a revolvable shaft 4.

The units can be advanced one at a time into the arms 3 as best indicated in Figure 8 at "A" and then by partial revolution of the arms dumped over to the position "B".

When in position "B" the planks all slide down edgewise until they bear against the upper edges of the supporting advance arm as shown, and at which time the pick off chains 5 extending adjacent the unit at a slightly different angle than the lower edges of the boards, pick off the forward boards one at a time, layer after layer, and pass the boards up an incline to the sorting table or conveyor chains 6.

The picking off of the boards is effected by the nubs or enlargements at the points of articulation of the chains as illustrated in Figure 4 and where it will be observed that the lower edges of the boards 1 present a stepped arrangement to the chains so that the advance board 1' is easily nubbed from the unit. This stepped arrangement of the board edges is due to the angle of the co-operating edges of the arms embracing the unit being an obtuse angle, and the more obtuse the angle the more pronounced are the steps.

The angle between any two sets of arms is made obtuse by the arms being much wider at the hub portion than at the extremities, and if desired the angle may be further increased by using three sets of arms instead of four.

The boards fall by gravity as the lower one is picked off, and after the picking chains have picked off the first layer of boards it is manifest that the chains must approach closer to the unit in order to pick off the next layer, and also that the chains must not approach too close so as to forcibly pick off two layers instead of one. This is easily done by one of several, or a combination of several means, either the tipping arms 3 may be slowly advanced by power or hand at a speed which will give the pick off chains time enough to clear layer after layer of boards without choking or overlapping, or, in addition or instead of this the pick off chains may also be carried on swinging arms 7 and raised gradually as the boards are removed.

The mechanism for moving the tipping arms 3 as described is shown in Figures 1 and 2, and the additional mechanism for moving the swinging arms 7 is illustrated in Figures 8 and 9.

In still further detail it will be observed that the shaft 4 which carries the tipping arms also serves as a support or bearing for the head sprockets 8 for the receiving conveyor 2 and which sprockets are secured to driving sprockets 9 so that both will idle together on the shaft, and the sprockets 9 are driven by chains 10 from sprockets 11 on a jack shaft 12 geared through reduction gears 13 extending beneath the mill floor 14 to driving elements carried under the floor including a pair of spur frictions 15 driven by belting 16 from one side of a motor 17, while from the other side of the motor a belt 18 drives a set of reversing frictions 19 suitably geared down to a worm shaft 20 carrying a worm 21 meshing with a worm wheel 22 secured to the tipping arm shaft 4 for revolving the arms. The worm shaft also extends to a pair of bevel gears 23 connecting a vertical shaft 24 extending above the floor and topped with a handwheel 25.

A pair of hand levers 26 and 27 also extend through the floor adjacent the handwheel whereby the spur frictions 15 can be engaged or disengaged to operate the receiving conveyor and bring a fresh unit to the exact position required to properly enter the receiving set of tipping arms, and also the reversing frictions 19 can be selectively engaged to either advance or reverse the arms,—it being understood that tho the arms normally revolve to the right, it is just as feasible to reverse the arms to pick up the fresh unit by the same arms just emptied of a unit by the pick off chains, and in which case of course the shaft never makes a complete revolution and therefore but two arms would be required on each spider instead of four.

When the shaft is revolved the arms pass through slots in the floor as indicated, and just forward of the shaft is a large opening 28 through the floor to permit the "stickers" of stuck units to fall to a lower level for there assembling for re-using.

From the drive shown it will be seen that the tipping arms are locked in any position by the worm, and also that the arms may be advanced by power to the picking position, then further advanced by power or by the handwheel 25 for the successive picking off of the boards.

If power is used to control the picking it is desirable that the speed of travel of the arms be reduced to keep within the capacity of the pick off chains as suggested, and this may be done either with an extra reduction gear introduced at some point in the transmission, or better by a variable speed motor controlled by the switch 29 through the wiring 29'.

The sorting conveyor chains are driven by any available source of power delivered to the head shaft of the conveyor at the other end, not shown in the drawings, and on the tail shaft 30 are sprockets 31 connected by chains 32 to sprockets 33 to the head shaft 36 of the pick off chain conveyor and whereby the pick off chains operate continuously with the sorting conveyor.

The pick off chains are supported in suitable channel tracks 34 as shown in Figures 5 and 6, and at the discharge end of the chains are inclined blocks 35 for delivering the boards 1' gently to the sorting conveyor, tho of course this may also be accomplished by lowering the pick off chain head sprockets 37 on their shaft 36.

The tail sprockets 38 for the pick off chains idle on the tipping arm shaft, and the picking chain angle is maintained by the channel iron guides 34, and which are gently curved to discharge the boards to the sorting conveyor as shown.

Instead of the channels being fixed they may be carried on pivoted or swinging arms 7 as shown in Figures 8 and 9 having sprockets at opposite ends and driven directly from the sorting conveyor tail shaft 30. The swinging arms 7 each have a connecting rod 39 extending to a crank 40 on shaft 41 and may be raised gradually to pick off the boards as described, either by hand through operation of the handwheel 31 geared to the shaft as indicated, or through power from reversing frictions 42 driven from a shaft 43 receiving its power preferably from the sorting conveyor.

A worm gear 44 on shaft 45 forms one of the transmission elements so that the arms 7 cannot fall, and a friction shifting lever 46 provides for applying or reversing the power through sliding of the frictions secured to shaft 47, which in turn is suitably geared at 48 to the shaft 45.

In Figure 10 the sectional construction of arms 7 and rods 39 is shown.

With this quadruple control as described, for picking off the boards, (hand or power at the tipping arms, and hand or power at the pick off chains) every provision for controlling the operation from either point is assured, and while we have shown and mentioned chains and chain conveyors throughout this specification it is evident without illustration that any equivalents such as belts, or cables, slatted or otherwise nubbed, cable conveyors, rolling conveyors, or any of the various well known forms of such devices may be interchanged with those shown to carry out our method of unstacking, and we feel entitled to the exclusive rights to the use of any such combinations to effect our purpose, and also to any method of tipping the units whereby the boards become available for gravitational delivery of successive boards or successive layers of boards, and therefore we claim as our invention.

Claims:—

1. In a lumber unstacker of the character described, two sets of spider arms projecting radially from a common shaft, said sets of arms being arranged to embrace between the sets an obtuse angle for support of a lumber unit against both sets of arms and whereby the supported sides of the unit will form the same obtuse angle and the edges of the boards of the unit will become in stepped relation, one to the other.

2. In an apparatus of the character described, means for tipping a lumber unit at an angle, and means for successively nubbing the boards therefrom comprising a device having nubs adapted to engage the edge of each board in succession.

3. In an apparatus of the character described, means for stepping the edges of the boards in a lumber unit, and means for removing the boards consecutively by engaging them at their stepped edges.

4. In an apparatus of the character described, a tipping device adapted to support a lumber unit, means for depositing a lumber unit therein, means for tipping the device with the unit therein, and means for removing the boards from one of the slanted sides of the tipped unit.

5. In a structure as defined in claim 4, said last mentioned means comprisng a traveling conveyor running adjacent the slanted side and adapted to remove the boards therefrom consecutively.

6. In an apparatus of the character described, means for stepping the edges of the boards in a lumber unit comprising a travelling conveyor running adjacent the slanted side of the unit and having portions adapted to consecutively rub off the boards from the slanted side for the purpose specified.

7. In an apparatus of the character described, means for picking off the boards from the side of an angularly placed lumber unit, comprising a plurality of conveyor elements adapted to be brought into successive engagement with each board while traveling at an angle to their edges and sides.

8. In an apparatus of the character described, means for picking off the boards from the slanted side of an angularly placed lumber unit, comprising a plurality of conveying elements adapted to be brought into successive engagement with each board while traveling at an angle to their edges and sides, and means for adjusting the angular position of the conveying elements to and from the edges of the boards.

9. In an apparatus of the character described, means for picking off the boards from the slanted side of an angularly placed lumber unit, comprising a plurality of conveying elements adapted to be brought into contact with the boards at an angle to their edges, and means for altering the angular relation of the conveying elements to the edges of the boards.

10. In an apparatus of the character described, a horizontally disposed shaft, a plurality of sets of spider arms secured thereto, said arms being adapted to pick up with one set of arms a lumber unit placed against them transversely of the arms at one side of the shaft and carry the unit over the shaft transferring the weight of the unit to another set of arms, and means for actuating said shaft to move the arms in either direction of rotation.

11. In a structure as defined in claim 10, the last mentioned means including a worm-wheel secured to the shaft, a worm meshing therewith, a revolvable shaft secured to the worm, and means for actuating the latter shaft by power from one point, and by hand from another point for minute control.

12. In an apparatus of the character described, a plurality of revolvable arms mounted on a horizontal shaft, a traveling conveyor adapted to deliver a lumber unit to the arms transversely thereof, means for revolving the arms to carry the unit over the shaft, and means for then removing the boards consecutively from the unit.

13. In a lumber unstacker of the character described, two sets of arms pivotally supported and arranged to embrace between the sets an obtuse angle and adapted to hold a lumber unit within the obtuse angle for shifting from one set of arms to the other upon moving the arms on their pivotal support.

JAMES M. LEAVER.
JAMES M. LEAVER, Jr.